(12) United States Patent
Heo et al.

(10) Patent No.: US 8,107,199 B2
(45) Date of Patent: Jan. 31, 2012

(54) RAMP TO PARK READ/WRITE HEAD AND HARD DISK DRIVE INCLUDING THE SAME

(75) Inventors: Baek-ho Heo, Suwon-si (KR); Ki-tag Jeong, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 394 days.

(21) Appl. No.: 12/419,459

(22) Filed: Apr. 7, 2009

(65) Prior Publication Data

US 2009/0251824 A1 Oct. 8, 2009

(30) Foreign Application Priority Data

Apr. 7, 2008 (KR) .................. 10-2008-0032183

(51) Int. Cl.
*G11B 5/54* (2006.01)
*G11B 21/08* (2006.01)
(52) U.S. Cl. .................. 360/254.8; 360/244; 360/265.9

(58) Field of Classification Search .................. 360/244, 360/254.8
See application file for complete search history.

(56) References Cited

U.S. PATENT DOCUMENTS 6,278,584 B1 8/2001 Zhang et al.

FOREIGN PATENT DOCUMENTS

JP 2003-141841 5/2003
KR 1997-7990 2/1997

*Primary Examiner* — Ly D Pham
(74) *Attorney, Agent, or Firm* — Stanzione & Kim, LLP (57) ABSTRACT

A ramp to park a read/write head includes a fixed portion fixed to a base member of the hard disk drive, and a supporting portion to contact and support the tip-tab of the suspension assembly and includes an inclined rail surface and a horizontal rail surface which extend in a moving direction of the tip-tab, wherein a rail boundary between the inclined rail surface and the horizontal rail surface is inclined with respect to a lengthwise axis of the tip-tab. The rail boundary can be a straight line inclined at an angle with respect to the lengthwise axis of the tip-tab, or can be curved toward the horizontal rail surface or the inclined rail surface.

10 Claims, 6 Drawing Sheets

RAMP TO PARK READ/WRITE HEAD AND HARD DISK DRIVE INCLUDING THE SAME

CROSS-REFERENCE TO RELATED APPLICATIONS

This application claims priority under 35 U.S.C. §119(a) from Korean Patent Application No. 10-2008-0032183, filed on Apr. 7, 2008, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to a ramp to park a read/write head and a hard disk drive including the ramp.

2. Description of the Related Art

A hard disk drive (HDD) is a type of information storage device including a disk to which data can be written or from which data can be read, by using a read/write head. The HDD includes a disk, a spindle motor to rotate the disk, a read/write head, and an actuator for moving the read/write head to a desired location above the disk. All of these elements are protected by being covered with a base member and a cover member. The read/write head is moved to a desired location by the actuator while being elevated from a recording surface of the rotating disk by a predetermined height.

The actuator includes a swing arm rotatably coupled to an actuator pivot, a suspension assembly that is coupled to a front end of the swing arm and elastically supports a slider on which the read/write head is mounted toward a surface of the disk, and a voice coil motor (VCM) to rotate the swing arm When the HDD is turned on and the disk rotates, the VCM rotates the swing arm of the actuator in a counter clockwise direction so as to move the slider on which the read/write head is mounted over a recording surface of the disk, and the read/write head mounted on the slider reads data stored on the recording surface of the disk or writes data on the recording surface of the disk.

Alternatively, when the HDD is turned off, that is, when the disk does not rotate, the VCM rotates the swing arm in a clockwise direction so as to move the read/write head to be outside the recording surface of the disk. Therefore, since the read/write head is disposed outside the recording surface of the disk, the read/write head cannot contact the recording surface of the disk. To do this, a ramp to park the read/write head is disposed outside the disk and a suspension assembly of the HDD, including the read/write head, includes a tip-tab for contacting the ramp.

Figure 1:
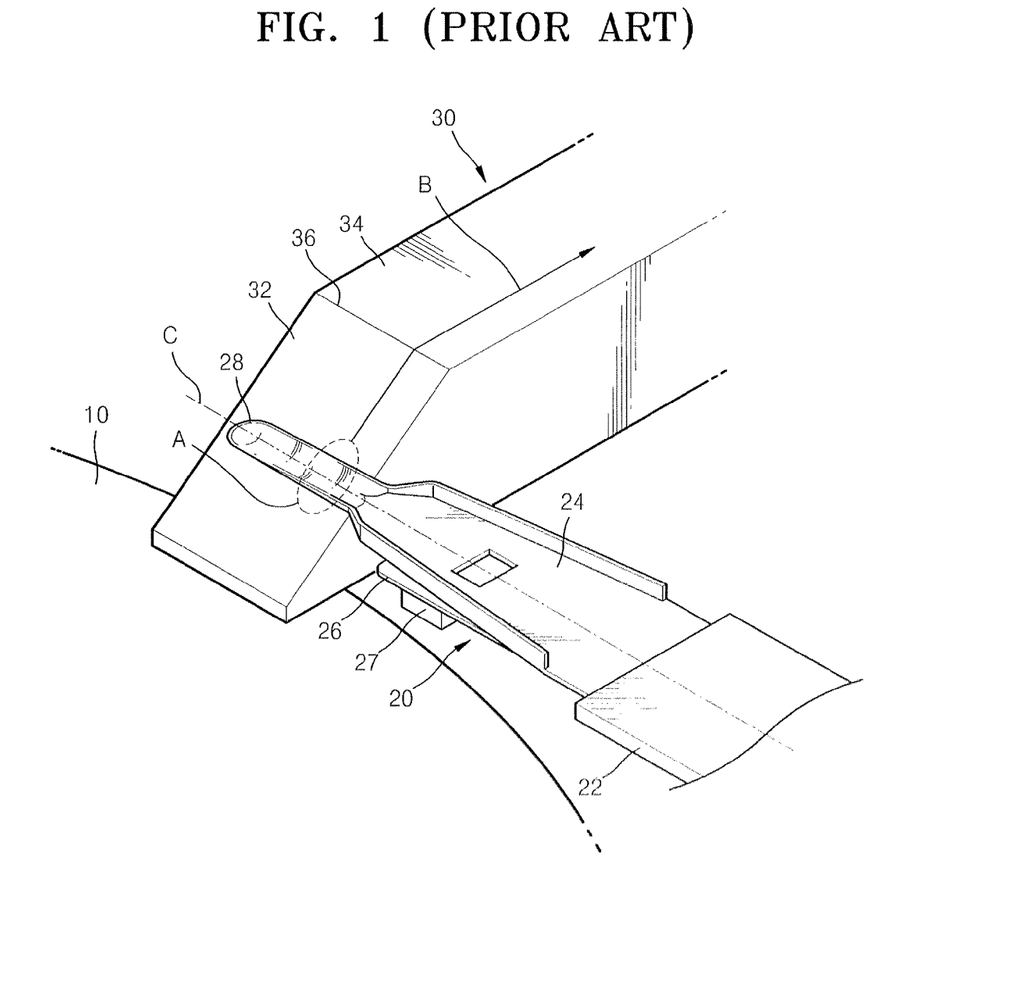
FIG. 1 is a perspective view illustrating a conventional ramp to park a read/write head and a suspension assembly having a tip-tab that is coupled to the ramp.

FIG. 1 is a perspective view illustrating a conventional ramp 30 to park a read/write head and a suspension assembly 20 of an HDD having a tip-tab for contacting the ramp.

Referring to FIG. 1, the suspension assembly 20 includes a tip-tab 28 extending from a front end of a road beam 24. The road beam 24 is coupled to a swing arm 22 of an actuator. A flexure 26 is coupled to the road beam 24, and a slider 27 including the read/write head is attached to and supported by the flexure 26. The ramp 30 is disposed outside a disk 10.

When an operation of the HDD stops, the tip-tab 28 is moved to the ramp 30, thereby parking the read/write head on the ramp 30. The tip-tab 28 may have a cross section protruding toward a surface of the ramp 30 in order to increase rigidity of the tip-tab 28. The ramp 30 has an inclined rail surface 32 and a horizontal rail surface 34, and a boundary line 36 between the inclined rail surface 32 and the horizontal rail surface 34 is parallel to a lengthwise axis C of the tip-tab 28. That is, the rail boundary 36 is perpendicular to a moving direction B of the tip-tab 28.

When the operation of the HDD stops, the tip-tab 28 moves from a position over the disk 10 onto the ramp 30 by a clockwise rotation of the actuator. Specifically, the tip-tab 28 contacts the inclined rail surface 32 of the ramp 30, and is elevated along the inclined rail surface 32 before moving onto the horizontal rail surface 34. As described above, the tip-tab 28 slides on the inclined rail surface 32 and the horizontal rail surface 34 in the moving direction B.

However, in the conventional ramp structure described above, as the tip-tab 28 moves in the moving direction B, a middle portion of the tip-tab 28 continuously contacts the inclined and horizontal rail surfaces 32 and 34 of the ramp 30. Therefore, when a contact site A, corresponding to the middle portion, of the tip-tab 28 and the inclined and horizontal rail surfaces 32 and 34 is fixed, a surface of the middle portion of the tip-tab 28 and surfaces of the middle portions of the inclined and horizontal rail surfaces 32 and 34 are easily worn due to friction continuously occurring between the tip-tab 28 and the inclined and horizontal rail surfaces 32 and 34, and particles generated due to the abrasion contaminate an inner portion of the HDD and degrade the performance of the HDD.

SUMMARY OF THE INVENTION

The present general inventive concept provides a ramp to park a read/write head, wherein the ramp has a large contact area with respect to a tip-tab of a suspension assembly, and a hard disk drive (HDD) including the ramp.

The present general inventive concept also provides a hard disk drive to reduce a level of abrasion of a tip-tab and rail surfaces of a ramp. The hard disk drive may include a contact site of the tip-tab and inclined and horizontal rail surfaces of the ramp, and the contact site may be changed when the tip-tab slides on the inclined and horizontal rail surfaces. Therefore, a contact area of the tip-tab and the inclined and horizontal rail surfaces of the ramp may be widened.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a ramp to park a read/write head of a hard disk drive, the ramp including a fixed portion fixed to a base member of the hard disk drive, and a supporting portion to contact and support a tip-tab of a suspension assembly and comprises an inclined rail surface and a horizontal rail surface which extend in a moving direction of the tip-tab, wherein a rail boundary between the inclined rail surface and the horizontal rail surface is inclined with respect to a lengthwise axis of the tip-tab.

The rail boundary may be a straight line inclined at an angle with respect to the lengthwise axis of the tip-tab, and the angle may be in a range of 30° to 60°.

The rail boundary may be convex-shaped with respect to the inclined rail surface.

The rail boundary may be convex-shaped with respect to the horizontal rail surface.

The foregoing and/or other aspects and utilities of the general inventive concept may also be achieved by providing a hard disk drive including a spindle motor mounted on a base member to rotate at least one disk, an actuator rotatably coupled to the base member and comprises a suspension assembly including a read/write head and a tip-tab, and a ramp disposed outside the disk and used to park the read/write head, the ramp including a fixed portion fixed to a base member of the hard disk drive, and a supporting portion to contact and support the tip-tab of the suspension assembly and including an inclined rail surface and a horizontal rail surface which extend in a moving direction of the tip-tab, wherein a rail boundary between the inclined rail surface and the horizontal rail surface is inclined with respect to a lengthwise axis of the tip-tab.

The foregoing and/or other aspects and utilities of the general inventive concept may be achieved by providing a ramp to contact a tip-tab of a hard disk drive to park a read/write head, the ramp including an inclined rail surface, a horizontal rail surface, and a rail boundary between the inclined rail surface and the horizontal surface, wherein the inclined rail surface and the horizontal rail surface contact different areas of the tip-tab.

The foregoing and/or other aspects and utilities of the general inventive concept may be achieved by providing a hard disk drive including an actuator including a tip-tab having a plurality of contact areas, a ramp to engage the actuator, the ramp having an inclined rail surface, a horizontal rail surface and a rail boundary between the inclined rail surface and the horizontal surface, wherein the inclined rail surface contacts one of the contact areas of the tip-tab and the horizontal rail surface contacts an other one of the contact areas of the tip-tab.

The rail boundary may contact an other contact area of the tip-tab.

The foregoing and/or other aspects and utilities of the general inventive concept may be achieved by providing a ramp to park a head of a hard disk drive, the ramp including a rail surface formed to guide the head and having a length in a direction of a radial axis of the head, the length varying in a moving direction of the head.

The foregoing and/or other aspects and utilities of the general inventive concept may be achieved by providing a hard disk drive including a head, and a ramp to park the head, and having a rail surface formed in a moving direction of the head and having a length in a direction of a radial axis of the head, the length varying in the moving direction of the head.

The head may include a tip-tab having a contact area with the rail surface, and the contact area varies in one of area and shape.

The head may include a tip-tab having a contact area with the rail surface, and the contact area moves along the radial axis direction.

The head includes a tip-tab having a contact area with the rail surface, and the contact area varies according to the moving direction of the head.

The ramp may include an inclined surface having a non-rectangular shape.

The ramp may include an inclined surface and a horizontal surface, and a boundary of the inclined surface and the horizontal surface is not perpendicular to the moving direction of the head.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
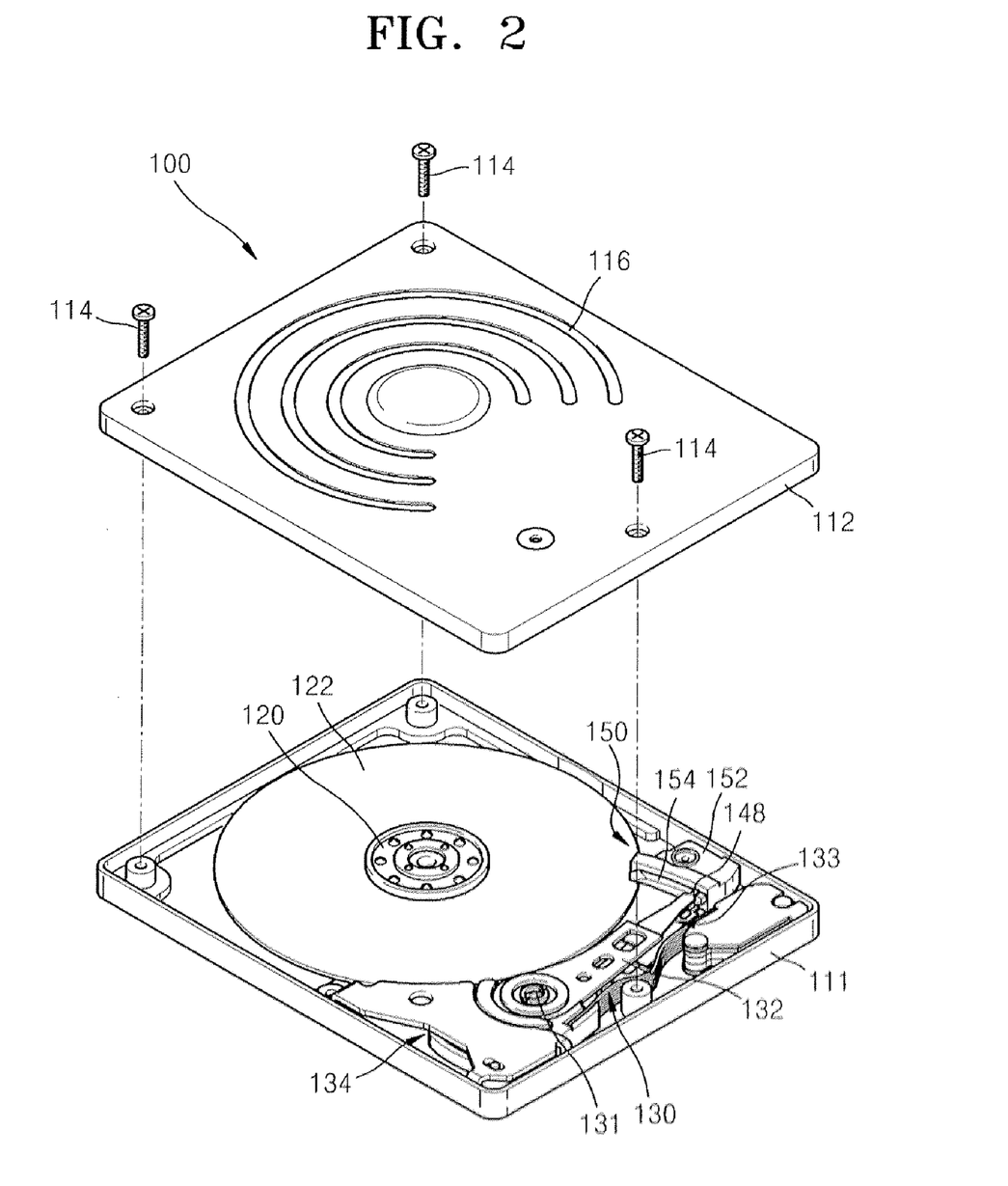
FIG. 2 is an exploded perspective view illustrating a hard disk drive (HDD) including a ramp to park a read/write head, according to an embodiment of the present general inventive concept.

FIG. 2 is an exploded perspective view illustrating a hard disk drive (HDD) 100 including a ramp 150 to park a read/write head, according to an embodiment of the present general inventive concept.

Referring to FIG. 2, the HDD 100 includes a spindle motor 120, a disk 122 that is rotated by the spindle motor 120, and an actuator 130 to move a read/write head to write and read data to and from a predetermined location of the disk 122. The actuator 130 includes a swing arm 132 rotatably coupled to an actuator pivot 131, a suspension assembly 133 that is coupled to a front end of the swing arm 132 to elastically support a slider on which the read/write head is mounted toward a surface of the disk 122, and a voice coil motor (VCM) 134 to rotate the swing arm 132.

The spindle motor 120 and the actuator 130 are mounted on a base member 111, and the base member 111 is coupled to a cover member 112 with screws 114. The cover member 112 may have reinforcing concentric grooves 116 to increase a rigidity of the cover member 112. The VCM 134 is controlled by a servo control system and the swing arm 132 of the actuator 130 rotates by an interaction between a current input to a VCM coil of the VCM 134 and a magnetic field formed by a magnet in a direction determined according to Fleming's left hand rule. That is, when the HDD 100 is turned on and the disk 122 rotates, the swing arm 132 rotates in a counter clockwise direction by the VCM 134 so as to move the read/write head over a recording surface of the disk 122. Alternatively, when the HDD 100 is turned off and the disk 122 does not rotate, the VCM 134 rotates the swing arm 132 in a clockwise direction and the read/write head is parked outside the disk 122.

The read/write head is parked using a tip-tab 148 of the suspension assembly 133 and the ramp 150 which is located outside the disk 122. The ramp 150 includes a fixed portion 152 that is fixed to the base member 111, and a supporting portion 154 that is combined with the fixed portion 152, and contacts and supports the tip-tab 148. The tip-tab 148 of the suspension assembly 133 and the supporting unit 154 of the ramp 150 will now be described in detail with reference to FIGS. 3 and 4.

Figure 3:
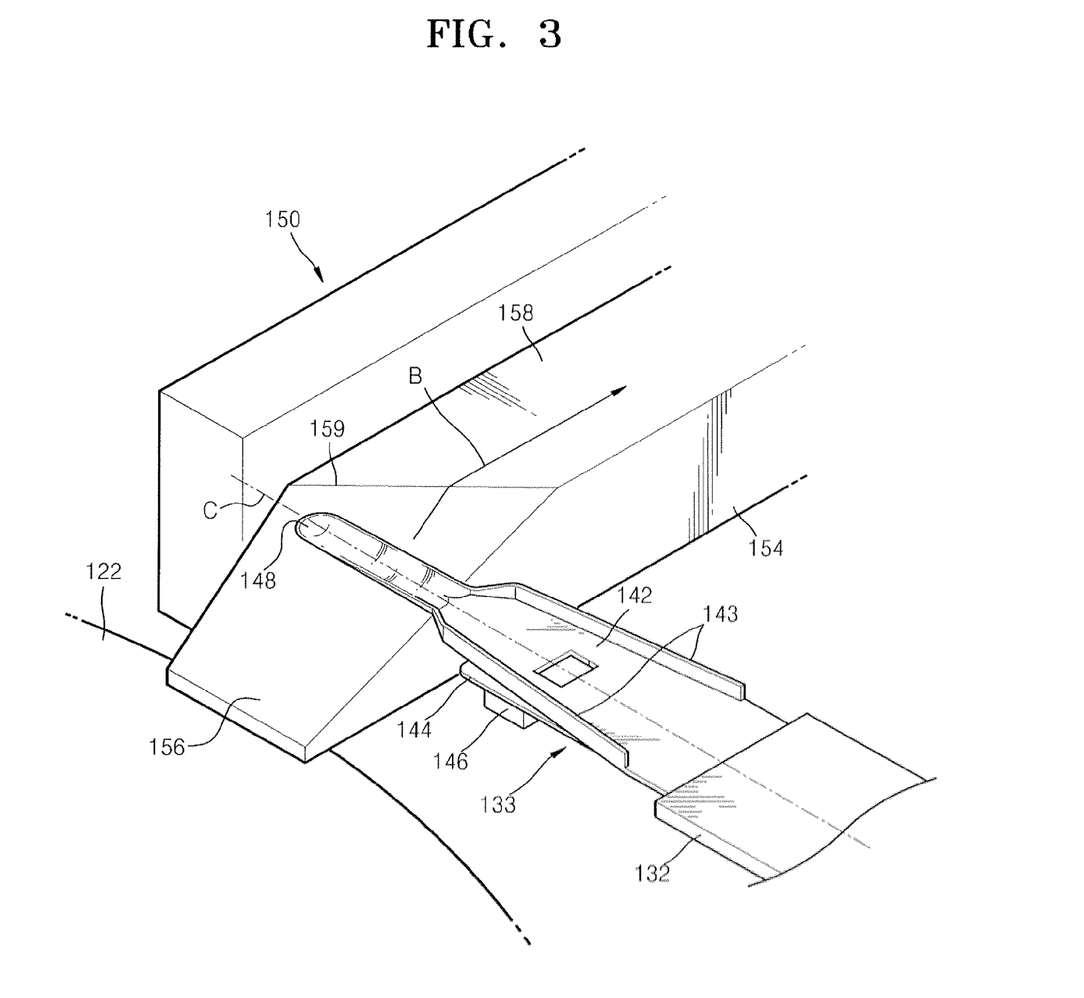
FIG. 3 is an enlarged perspective view illustrating the ramp and a suspension assembly of the HDD illustrated in FIG. 2, according to an embodiment of the present general inventive concept.
Figure 4:
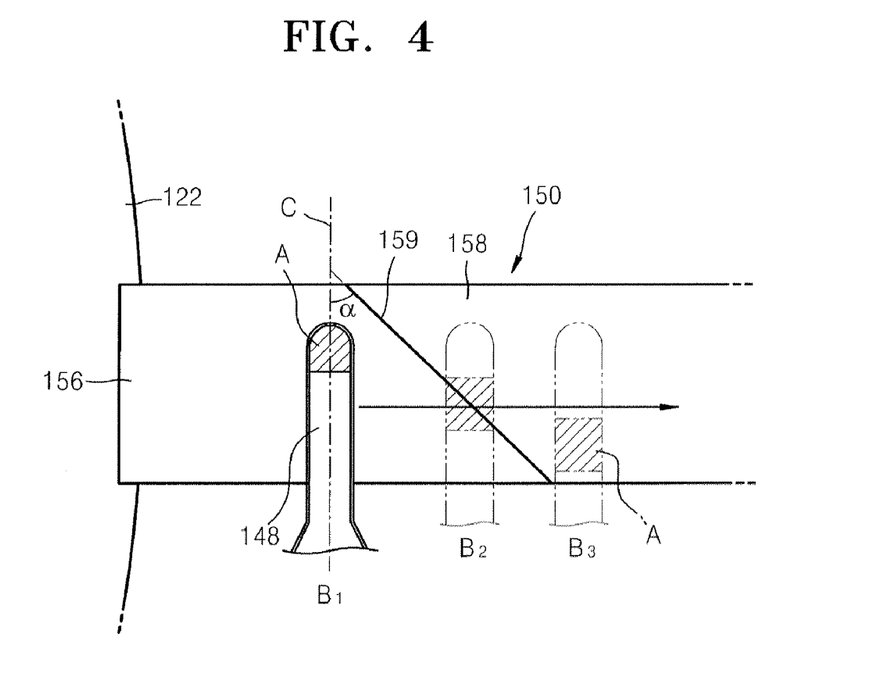
FIG. 4 is a plan view illustrating a change in a contact site of rail surfaces of the ramp and a tip-tap which are illustrated in FIG. 3, according to an embodiment of the present inventive concept.

FIG. 3 is an enlarged perspective view illustrating the ramp 150 and the suspension assembly 133 which are illustrated in FIG. 2, according to an embodiment of the present general inventive concept, and FIG. 4 is a plan view illustrating a change in a contact site of rail surfaces of the ramp 150 and the tip-tap 148 which are illustrated in FIG. 3, according to an embodiment of the present general inventive concept.

Referring to FIGS. 3 and 4, the suspension assembly 133 includes a road beam 142 coupled to the swing arm 132 of the actuator 130, a flexure 144 coupled to the road beam 142, and the tip-tab 148 extending from a front end of the road beam 142. To increase a rigidity of the road beam 142, side edges of the road beam 142 may be bent to form sidewalls 143. A slider 146 on which the read/write head is mounted is attached to and supported by the flexure 144. The tip-tab 148 extends a predetermined length from the front end of the road beam 142 in a lengthwise direction of the road beam 142. To increase the rigidity of the tip-tab 148, the tip-tab 148 may have a width-direction cross section to protrude toward the supporting portion 154 of the ramp 150.

The supporting portion 154 of the ramp 150 includes an inclined rail surface 156 and a horizontal rail surface 158 which extend in a moving direction of the tip-tab 148, that is, a direction as represented by an arrow B. According to an embodiment of the present general inventive concept, a rail boundary 159 between the inclined rail surface 156 and the horizontal rail surface 158 is inclined with respect to a lengthwise axis C of the tip-tab 148. For example, the rail boundary 159 may be a straight line that is inclined at an angle α with respect to the lengthwise axis C of the tip-tab 148. In this regard, the angle α may be in a range of 30° to 60°. That is, the rail boundary 159 is, not perpendicular to, but inclined with respect to the moving direction of the tip-tab 148, that is, the arrow B direction.

When the operation of the HDD 100 stops, the actuator 130 (FIG. 2) rotates in a clockwise direction so as to move the tip-tab 148 from a position over the disk 122 onto the ramp 150, and thus the tip-tab 148 contacts the inclined rail surface 156 of the supporting portion 154 of the ramp 150. Specifically, a front end of the tip-tab 148 contacts the inclined rail surface 156 at position B1 of FIG. 4. That is, the front end of the tip-tab 148 is the contact site A of the tip-tab 148 and the inclined rail surface 156. This is because, as described above, the rail boundary 159 is inclined with respect to the lengthwise axis C of the tip-tab 148 and thus, a portion of the inclined rail surface 156 corresponding to the front end of the tip-tab 148 at position B1 protrudes over other portions of the inclined rail surface 156.

When the tip-tab 148 moves in the arrow B direction and is positioned on the rail boundary 159 (position B2 of FIG. 4), the contact site A is changed from the front end of the tip-tab 148 to be closer to a middle portion of the tip-tab 148. When the tip-tab 148 completely passes the rail boundary 159 and reaches the horizontal rail surface 158 (position B3 of FIG. 4), the contact site A is the middle portion of the tip-tab 148.

As described above, according to a structure of the ramp 150 according to the current embodiment, as the tip-tab 148 moves in the arrow B direction, the contact site A of the tip-tab 148 and the inclined and horizontal rail surfaces 156 and 158 is changed. Therefore, a contact area of the tip-tab 148 and the inclined and horizontal rail surfaces 156 and 158 of the ramp 150 is increased, and thus, a level of abrasion of the tip-tab 148 and the inclined and horizontal rail surfaces 156 and 158 of the ramp 150 may be reduced.

The contact site A may be a contact area where the tip-tab 148 contacts the ramp 150. A shape of the contact area is changed according to a movement of the tip-tab 148 with respect to the ramp 150. An area of the contact area is changed according to the movement of the tip-tab 148 with respect to the ramp 150. The contact area is changed along the tip-tab 148 in a longitudinal direction of the tip-tab 148.

Figure 5:
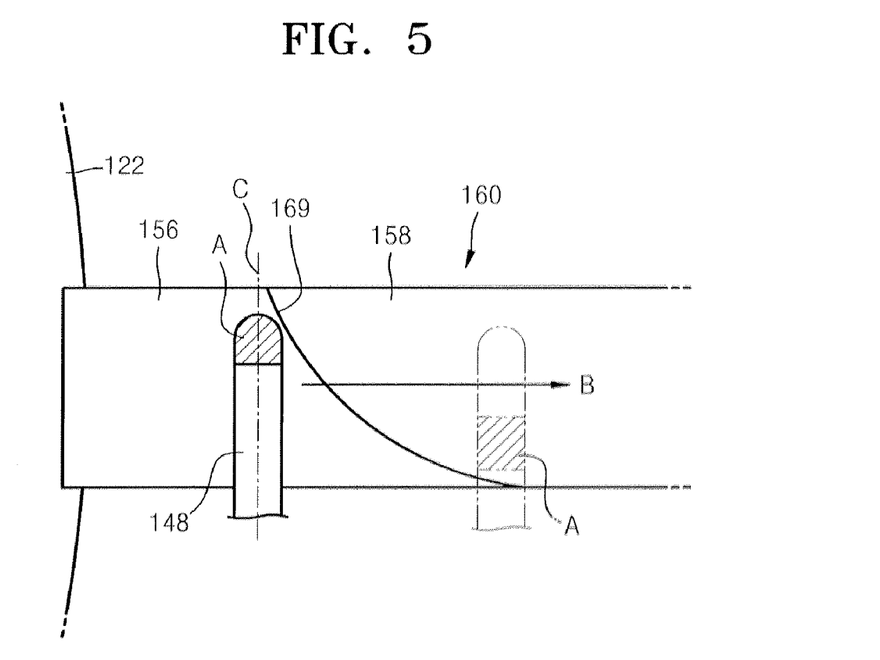
FIG. 5 is a plan view illustrating a ramp to park a read/write head, according to another embodiment of the present general inventive concept.
Figure 6:
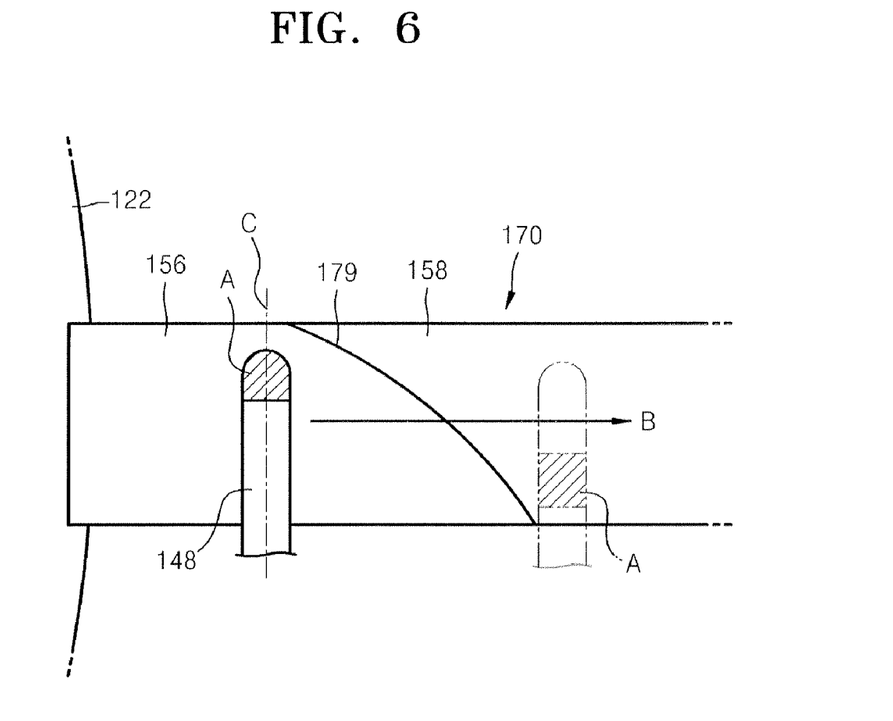
FIG. 6 is a plan view of a ramp to park a read/write head, according to another embodiment of the present general inventive concept.

FIG. 5 is a plan view illustrating a ramp 160 to park a read/write head, according to another embodiment of the present general inventive concept, and FIG. 6 is a plan view of a ramp 170 to park a read/write head, according to another embodiment of the present general inventive concept.

Referring to FIG. 5, the ramp 160 according to an embodiment of the present general inventive concept includes an inclined rail surface 156 and a horizontal rail surface 158, and a rail boundary 169 between the inclined rail surface 156 and the horizontal rail surface 158 is curved and inclined with respect to a lengthwise axis C of a tip-tab 148. Specifically, the rail boundary 169 is convex-shaped from the point of view of the inclined rail surface 156.

In the ramp 160 having the structure described above according to the current embodiment, a distance between a front end of the tip-tab 148 and the rail boundary 169 is reduced, a contact time period during which the front end of the tip-tab 148 contacts the inclined rail surface 156 is less than in the ramp 150 illustrated in FIG. 4. That is, a time period during which the front end of the tip-tab 148 is a contact site A is reduced. Instead, a time period during which the contact site A is changed from the front end portion of the tip-tab 148 to a middle portion of the tip-tab 148 is increased.

Referring to FIG. 6, the ramp 170 according to an embodiment of the present general inventive concept includes an inclined rail surface 156 and a horizontal rail surface 158, and a rail boundary 179 between the inclined rail surface 156 and the horizontal rail surface 158 is curved and inclined with respect to a lengthwise axis C of a tip-tab 148. Specifically, the rail boundary 179 is convex-shaped from the point of view of the horizontal rail surface 158.

In the ramp 170 having the structure described above according to the current embodiment, a distance between a front end of the tip-tab 148 and the rail boundary 179 is increased, and thus, a contact time period during which a front end of the tip-tab 148 contacts the inclined rail surface 156 is greater than in the ramp 150 illustrated in FIG. 4. That is, a time period during which the front end of the tip-tab 148 is a contact site A is increased. Instead, a time period during which the contact site A is changed from the front end of the tip-tab 148 to the middle of the tip-tab 148 is decreased.

As described above, in the ramps 160 and 170 respectively illustrated in FIGS. 5 and 6, a contact area of the tip-tab 148 and the inclined and horizontal rail surfaces 156 and 158 can be increased and a contact time period during which portions of the tip-tab 148 contact the inclined and horizontal rail surfaces 156 and 158 can be appropriately controlled.

Figure 7:
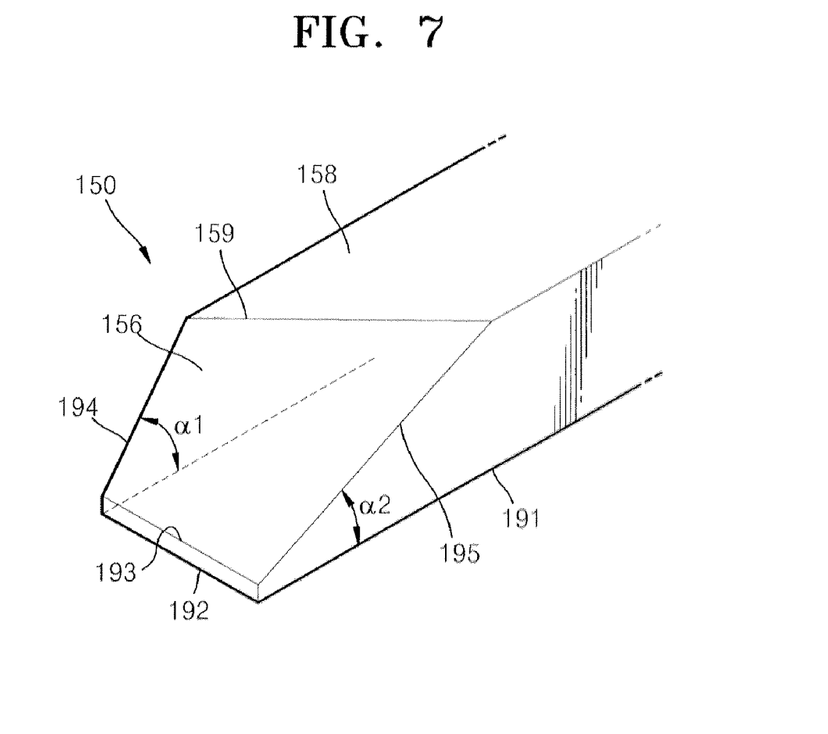
FIG. 7 is an enlarged view illustrating the ramp of the HDD according to an embodiment of the present general inventive concept.

FIG. 7 is an enlarged view illustrating the ramp of the HDD according to an embodiment of the present general inventive concept. Referring to FIG. 7, the ramp 150 includes the horizontal rail surface 158; the inclined rail surface 156 including a first outer edge 194, a second outer edge 195, and a bottom edge 193; the rail boundary 159 between the inclined rail surface 156 and the horizontal rail surface 158; and a bottom surface 191 opposite to the horizontal rail surface 158 and including a front edge 192. An angle, $a_1$, is formed between the first outer edge 194 of the inclined rail surface 156 and the bottom surface 191 of the ramp 150. Also, an angle, $a_2$, is formed between the second outer edge 195 of the inclined rail surface 156 and the bottom surface 191 of the ramp 150. The present general concept is not limited to the front edge 192 of the bottom surface 191 and the bottom edge 193 of the inclined surface 156 being different. For example, in an embodiment of the present general inventive concept, the front edge 192 of the bottom surface 191 and the bottom edge 193 of the inclined surface 156 may be the same edge.

Figure 8:
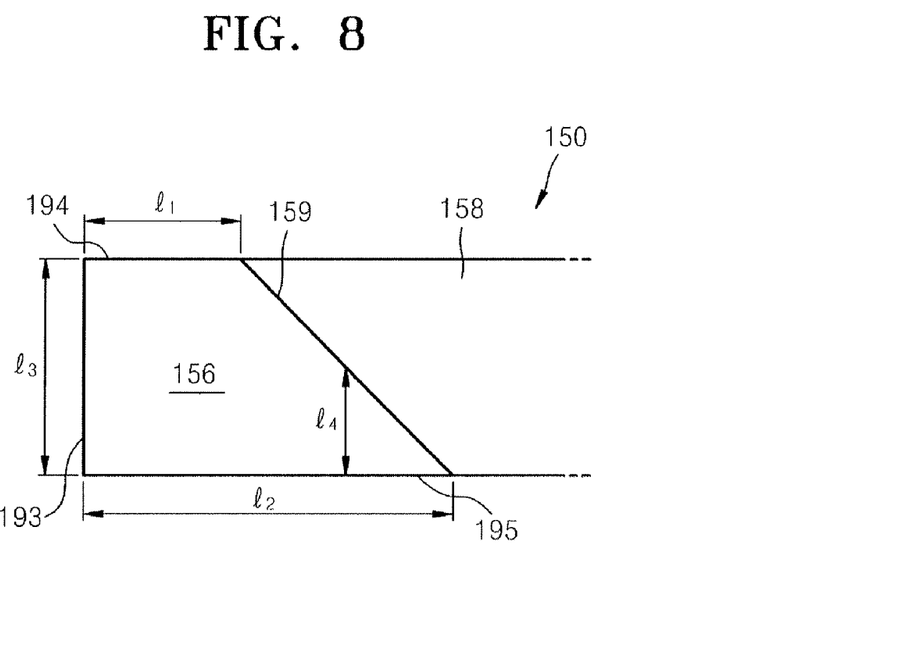
FIG. 8 is a top view illustrating a portion of the ramp of FIG. 7 according to an embodiment of the present general inventive concept.

FIG. 8 is a top view illustrating a portion of the ramp of FIG. 7 according to an embodiment of the present general inventive concept. Referring to FIG. 8, $I_1$ is a length of the first outer edge 194, $I_2$ is a length of the second outer edge 195, $I_3$ is a distance between the outer edges 194 and 195 of the inclined rail surface 156, and $I_4$ is a distance between the rail boundary 159 and the second outer edge 195 of the inclined rail surface 156. In the present embodiment, for example, $I_1$ is greater than $I_2$, and $I_3$ is greater than $I_4$.

Figure 9:
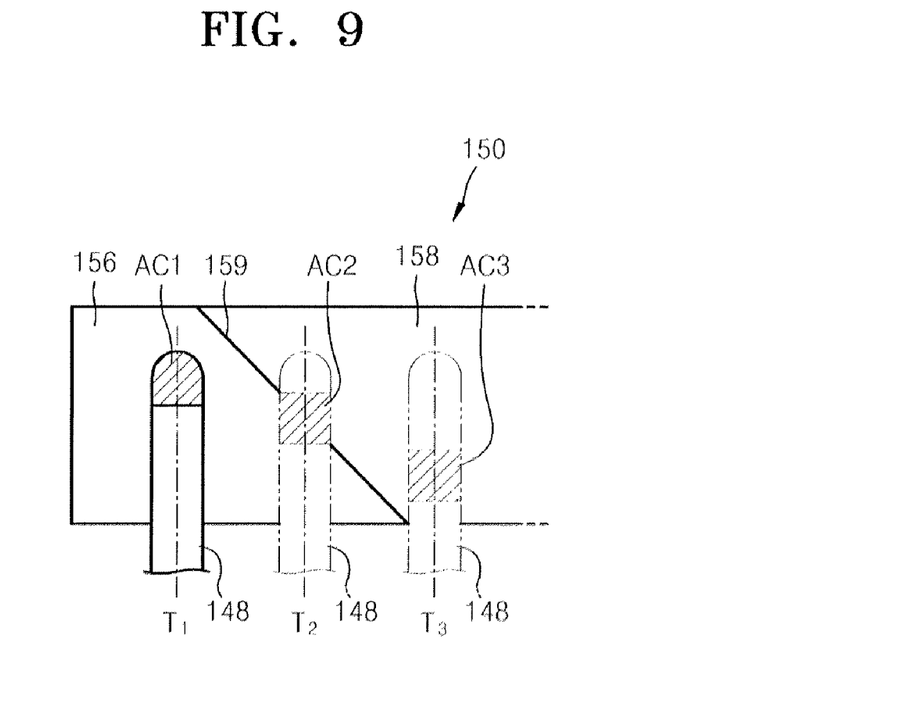
FIG. 9 is a view of the ramp of FIG. 7 illustrating a change of contact areas of the ramp and a tip-tab according to an embodiment of the present general inventive concept.

FIG. 9 is a view of the ramp of FIG. 7 illustrating a change of contact areas of the ramp and a tip-tab according to an embodiment of the present general inventive concept. Referring to FIG. 9, a radial axis of the tip-tab 148 may move with respect to the ramp 150. For example, referring to FIG. 9, at a time T1, the tip-tab 148 comes in contact with the ramp 150 at the inclined rail surface 156 forming a first contact area AC1. At a time T2, the tip-tab 148 comes in contact with the ramp 150 at the rail boundary 159 forming a second contact area AC2. At a time, T3, the tip-tab 148 comes in contact with the ramp 150 at the horizontal rail surface 158 forming a third contact area AC3. Thus, using multiple contact areas between the ramp 150 and the tip-tab 148 reduces wear on any one specific contact area.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. A ramp to park a read/write head of a hard disk drive, the ramp comprising:
    a fixed portion fixed to a base member of the hard disk drive; and
    a supporting portion to contact and support a tip-tab of a suspension assembly and comprises an inclined rail surface and a horizontal rail surface which extend in a moving direction of the tip-tab,
    wherein a rail boundary between the inclined rail surface and the horizontal rail surface is inclined with respect to a lengthwise axis of the tip-tab.

2. The ramp of claim 1, wherein the rail boundary comprises:
    a straight line inclined at an angle with respect to the lengthwise axis of the tip-tab.

3. The ramp of claim 2, wherein the angle is in a range of 30° to 60°.

4. The ramp of claim 1, wherein the rail boundary comprises:
    a convex-shaped with respect to the inclined rail surface.

5. The ramp of claim 1, wherein the rail boundary comprises:
    a convex-shaped with respect to the horizontal rail surface.

6. A hard disk drive, comprising:
    a spindle motor mounted on a base member to rotate at least one disk;
    an actuator rotatably coupled to the base member and comprises a suspension assembly comprising a read/write head and a tip-tab; and
    a ramp disposed outside the disk and used to park the read/write head, the ramp comprising:
    a fixed portion fixed to a base member of the hard disk drive; and
    a supporting portion to contact and support the tip-tab of the suspension assembly and comprises an inclined rail surface and a horizontal rail surface which extend in a moving direction of the tip-tab,
    wherein a rail boundary between the inclined rail surface and the horizontal rail surface is inclined with respect to a lengthwise axis of the tip-tab.

7. The hard disk drive of claim 6, wherein the rail boundary comprises:
    a straight line inclined at an angle with respect to the lengthwise axis of the tip-tab.

8. The hard disk drive of claim 7, wherein the angle is in a range of 30° to 60°.

9. The hard disk drive of claim 6, wherein the rail boundary comprises:
    a convex-shaped with respect to the inclined rail surface.

10. The hard disk drive of claim 6, wherein the rail boundary comprises:
    a convex-shaped with respect to the horizontal rail surface.

* * * * *